(12) United States Patent
Della Camera

(10) Patent No.: US 7,055,567 B1
(45) Date of Patent: Jun. 6, 2006

(54) TIRE TRACTION APPARATUS

(76) Inventor: Frank Della Camera, 117 Short Beach Rd., East Haven, CT (US) 06512

( * ) Notice: Subject to any disclaimer, the term of this patent is extended or adjusted under 35 U.S.C. 154(b) by 156 days.

(21) Appl. No.: 10/839,389

(22) Filed: May 5, 2004

(51) Int. Cl.
*B60B 11/00* (2006.01)
*B60B 27/00* (2006.01)

(52) U.S. Cl. ............... 152/218; 152/225 R; 152/225 C

(58) Field of Classification Search ............ 152/213 R, 152/213 A, 217–218, 225 R, 226, 225 C
See application file for complete search history.

(56) References Cited

U.S. PATENT DOCUMENTS

| | | | |
|---|---|---|---|
| 2,273,753 A | | 2/1942 | Gelinas |
| 2,576,868 A | * | 11/1951 | Wolf ........................ 152/228 |
| 2,867,259 A | * | 1/1959 | Barron ................... 152/225 C |
| 3,073,370 A | * | 1/1963 | Frank ........................ 152/218 |
| 3,198,233 A | * | 8/1965 | Aler ........................... 152/218 |
| 3,283,796 A | * | 11/1966 | White et al. ................ 152/218 |
| 3,827,473 A | | 8/1974 | Blickensderfer et al |
| 3,860,053 A | | 1/1975 | Hatten et al. |
| 3,875,987 A | | 4/1975 | Nesseth |
| 3,891,018 A | | 6/1975 | Hyggen |
| 3,918,504 A | * | 11/1975 | Prokesch ................ 152/225 R |
| 4,089,359 A | | 5/1978 | Jones |
| 4,180,115 A | | 12/1979 | Yamagishi |
| 4,209,049 A | | 6/1980 | Regensburger |
| 4,378,833 A | | 4/1983 | Lindblad et al. |
| 4,529,023 A | | 7/1985 | Deland |
| 4,834,158 A | | 5/1989 | Katz |
| 4,862,936 A | | 9/1989 | McDonough |
| 4,872,496 A | | 10/1989 | Fortner |
| 5,513,684 A | * | 5/1996 | Laub ........................ 152/216 |
| 6,016,856 A | | 1/2000 | Hynes |
| 6,053,227 A | | 4/2000 | Robeson |
| 6,341,635 B1 | | 1/2002 | Robeson |

* cited by examiner

*Primary Examiner*—Jason R. Bellinger
(74) *Attorney, Agent, or Firm*—Raymond Nuzzo

(57) ABSTRACT

A vehicle tire-traction apparatus has a pair of tire-traction sections wherein each tire-traction section has a generally arcuate member for placement over a vehicle tire outer sidewall. Each tire-traction section has a plurality of arm members attached to the arcuate member such that the arm members are transverse to the arcuate member and extend radially. Each tire-traction member also has a plurality of finger members wherein each finger member is attached to a corresponding arm member such that the finger member is angulated with respect to the arm member and extends over the vehicle tire tread and a portion of the vehicle tire inner sidewall. Each tire-traction section has a plurality of tire-tread contact members. Each tire-tread contact member is attached to a corresponding finger member and extends over a portion of the vehicle tire tread. Each tire-tread contact member is located between the finger member and the vehicle tire tread. The tire-traction apparatus also has a tension-producing connection device to connect both tire traction sections together and secure the tire traction sections to the vehicle tire.

1 Claim, 8 Drawing Sheets

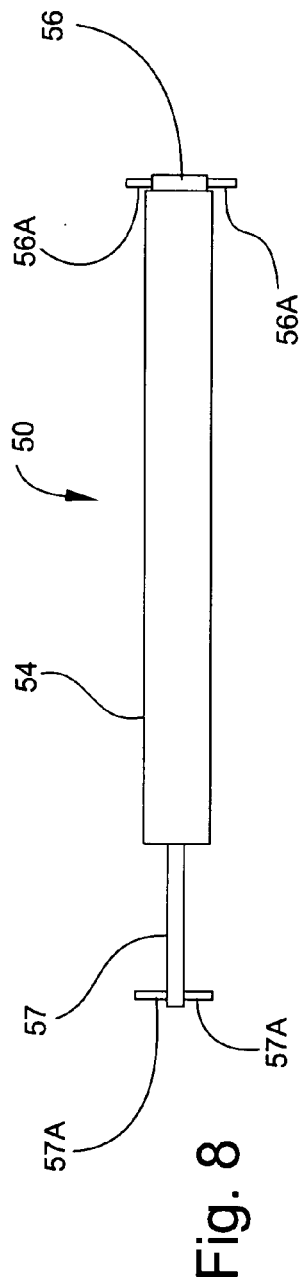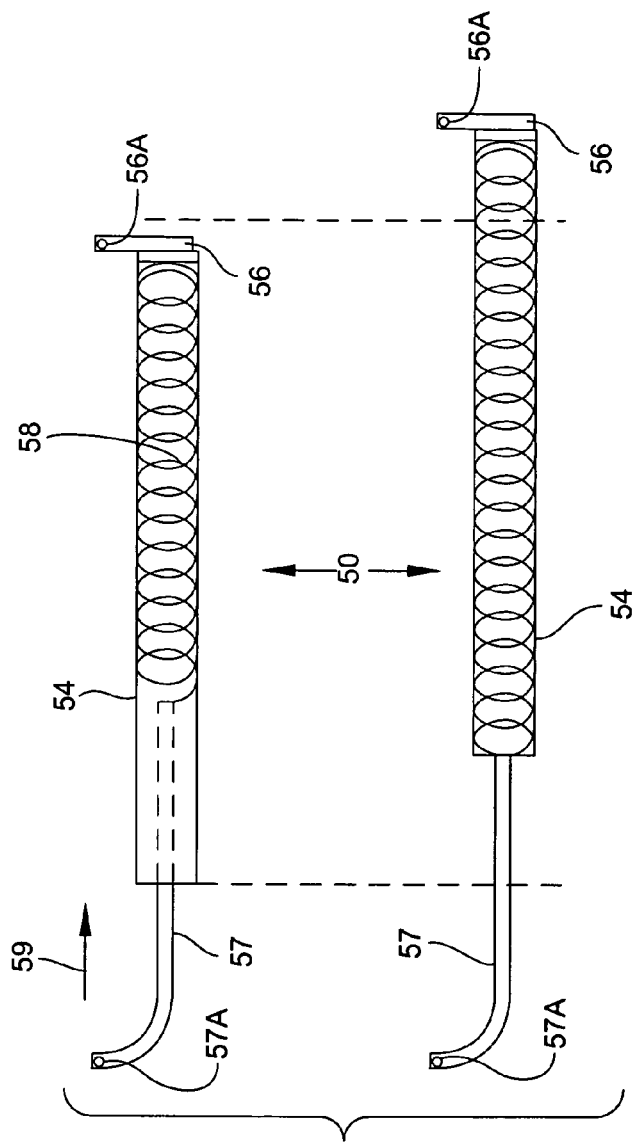
Fig. 8
Fig. 9

TIRE TRACTION APPARATUS

BACKGROUND OF THE INVENTION

1. Field of the Invention

The present invention relates to a tire-traction apparatus.

2. Description of the Related Art

Tire-traction devices are known in the art. Such devices are disclosed in U.S. Pat. Nos. 2,273,753, 3,827,473, 3,875,987, 3,860,053, 3,891,018, 4,089,359, 4,180,115, 4,209,049, 4,378,833, 4,529,023, 4,834,158, 4,862,936, 4,872,496, 6,016,856, 6,053,227 and 6,341,635. Such tire traction devices are typically mounted to vehicle tires to provide traction to vehicle tires to facilitate travel on soft roadbed or through snow or mud.

SUMMARY OF THE INVENTION

It is an object of the present invention to provide a new and improved tire traction apparatus.

It is another object of the present invention to provide a tire traction apparatus that is easy to transport, use and store.

Other objects and advantages of the present invention will be apparent from the ensuing description.

Thus, the present invention is directed to, in one aspect, a vehicle tire-traction apparatus for use with a vehicle tire having an outer sidewall, an inner sidewall and a tire tread. The tire-traction apparatus comprises a pair of tire-traction sections. Each tire-traction section comprises a generally arcuate member configured for placement over the vehicle tire outer sidewall. The arcuate member has a curvature that generally corresponds to the curvature of the vehicle tire. Each tire-traction section further comprises a plurality of arm members attached to the arcuate member such that the arm members are transverse to the arcuate member and extend radially. Each tire-traction section further comprises a plurality of finger members. Each finger member is attached to a corresponding arm member such that the finger member is angulated with respect to the arm member and extends over the vehicle tire tread and a portion of the vehicle tire inner sidewall. Each tire-traction section further includes a plurality of tire-tread contact members. Each tire-tread contact member is attached to a corresponding finger member in such a manner that the tire-tread contact member extends over a portion of the vehicle tire tread and is located between the finger member and the vehicle tire tread. The tire-traction apparatus further includes a tension-producing connection device to connect both tire traction sections together and secure the tire traction sections to the vehicle tire.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which:

FIG. 8 is a top plan view of the tension-producing connection device of the tire-traction apparatus of the present invention.

FIG. 9 shows side views of the tension-producing connection device of FIG. 8, the views illustrating the operation of the tension-producing connection device.

DESCRIPTION OF THE PREFERRED EMBODIMENTS

Figure 1:
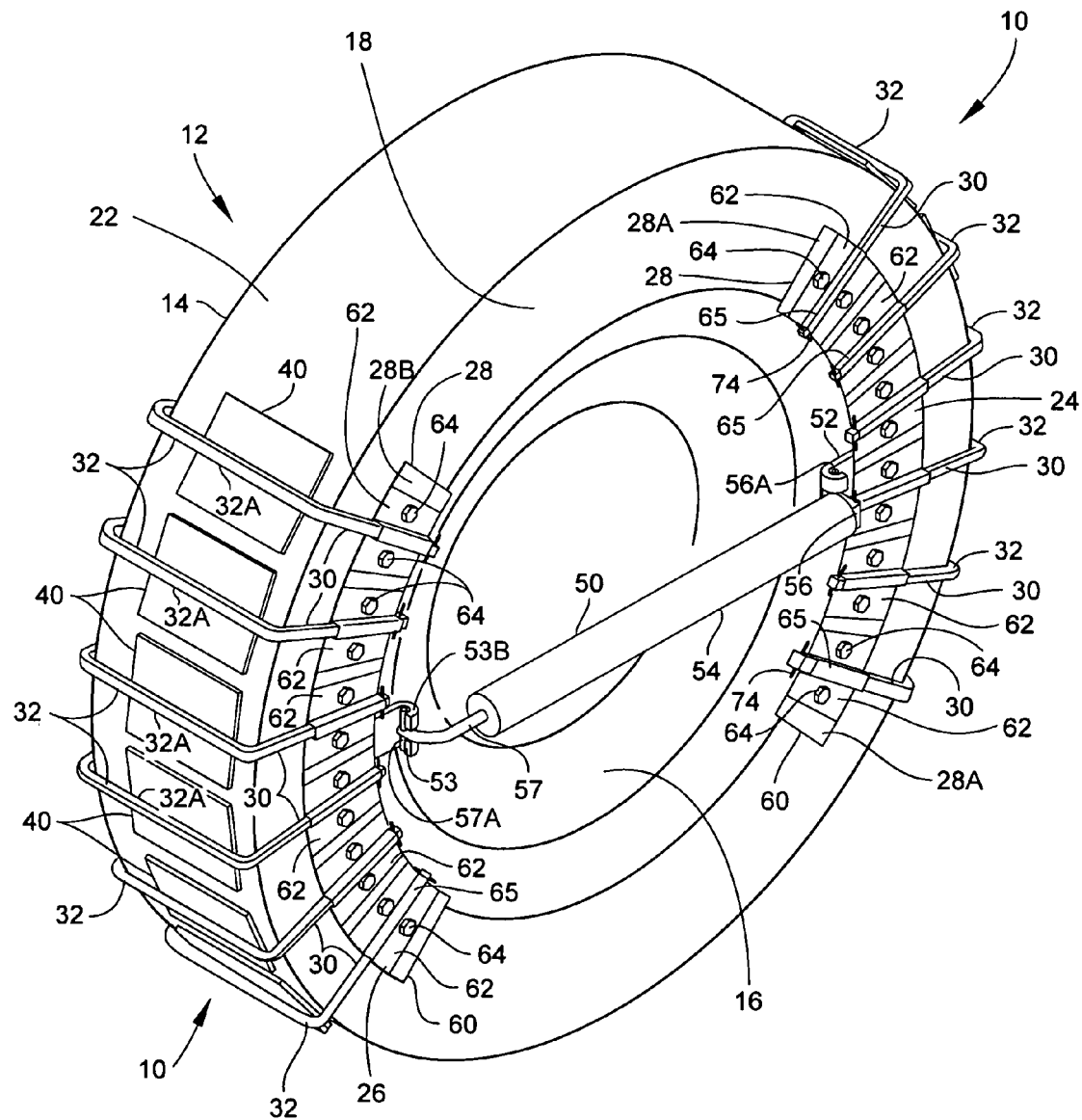
FIG. 1 is a perspective view of the tire traction apparatus of the present invention mounted to a vehicle tire.
Figure 2:
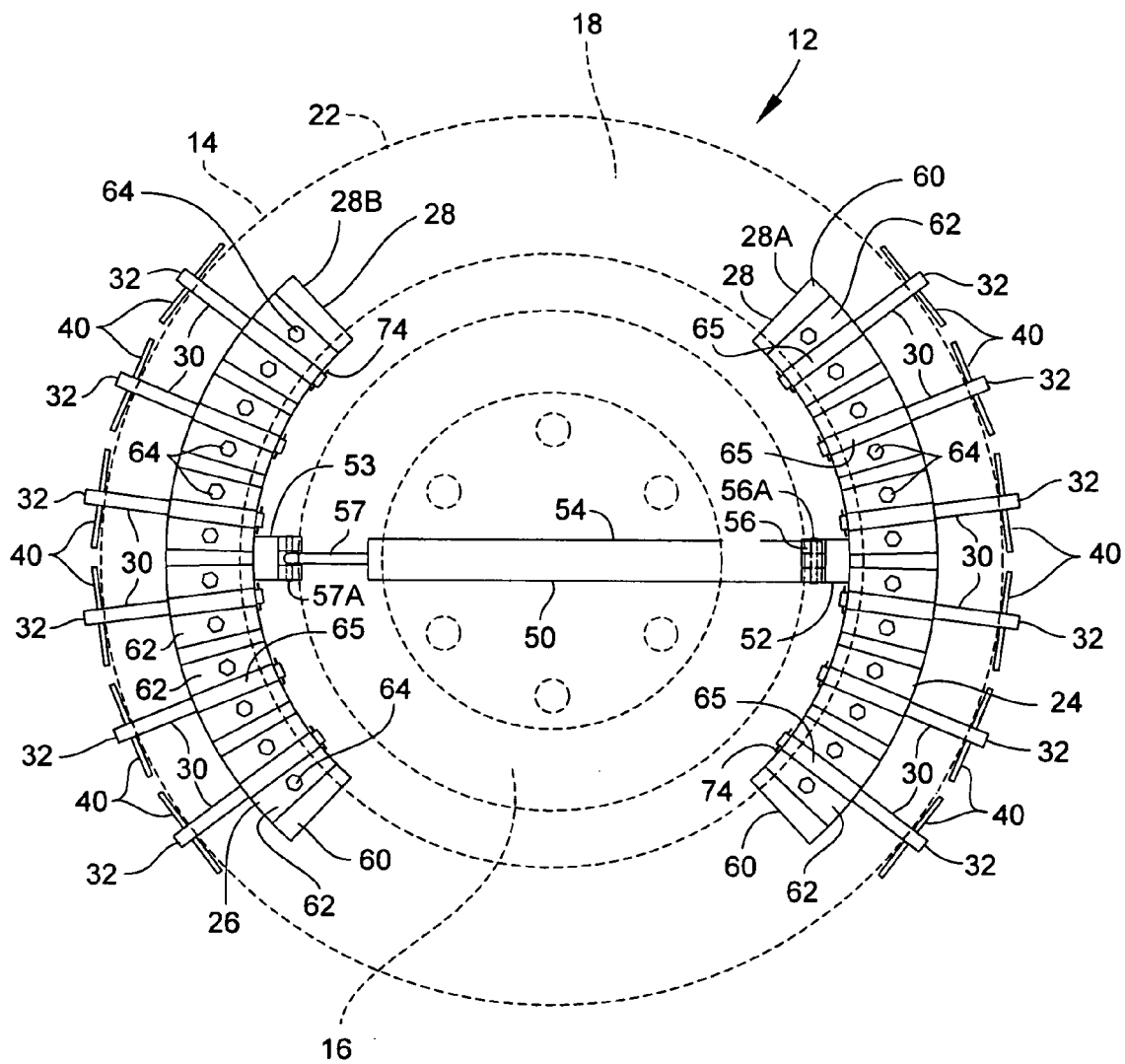
FIG. 2 is a side elevational view of the tire traction apparatus of the present invention mounted to a vehicle tire, the vehicle tire and rim being shown in phantom.

Referring to FIGS. 1–4, tire-traction apparatus 10 of the present invention is mounted to wheel 12. Wheel 12 comprises tire 14 and rim 16. Tire 14 is mounted to rim 16 by any suitable technique known in the art. Tire 14 comprises outer sidewall 18, an inner sidewall 20 facing the vehicle chassis, and tire tread 22. Vehicle tire-traction apparatus 10 comprises a pair of tire-traction sections 24 and 26. When tire-traction sections 24 and 26 are mounted on vehicle tire 14 as shown in FIGS. 1 and 2, tire-traction sections 24 and 26 are diametrically positioned. In accordance with the invention, tire-traction sections 24 and 26 are identically constructed. Each tire-traction section 24 and 26 comprises a generally arcuate member 28 for placement on outer sidewall 18 of vehicle tire 14. For purposes of describing the invention, reference numeral 28A is used to refer to arcuate member 28 of tire-traction section 24, and reference numeral 28B is used to refer arcuate member 28 of tire-traction section 26. Each arcuate member 28 has a curvature that generally corresponds to the curvature of vehicle tire 14. Each tire-traction section 24 and 26 further comprises a plurality of arm members 30. Arm members 30 are transversely attached to arcuate member 28 and extend radially. As shown in FIGS. 1 and 2, arm members 30 extend over outer sidewall 18 of vehicle tire 14. In a preferred embodiment, each arm member 30 is movably attached to arcuate member 28. The attachment of arm members 30 to arcuate members 28A and 28B is described in detail in the ensuing description. In a preferred embodiment, each arm member 30 has a generally square cross-section. However, it is to be understood that arm members 30 can have other suitable cross-sectional shapes as well. Each tire-traction section 24 and 26 further comprises a plurality of finger members 32. Each finger member 32 is attached to a corresponding arm member 30. Each finger member 32 is angulated with respect to its corresponding arm member 30. Finger member 32 has portion 32A that extends over tire tread 22 and portion 32B that extends over a portion of inner sidewall 20 (see FIG. 4). This particular structure of finger member 32 enables tire traction sections 24 and 26 to grasp vehicle tire 14 and prevents tire traction sections 24 and 26 from falling off of vehicle tire 14. In a preferred embodiment, each finger member 32 has a generally square cross-section. It has been found that finger members 32 can quickly penetrate the snow, mud, soft roadbed or other difficult terrain if the finger members 32 have a generally square cross-section. Thus, such a characteristic results in improved traction. However, it is to be understood that each finger member 32 can have other suitable cross-sectional shapes as well.

Figure 3:
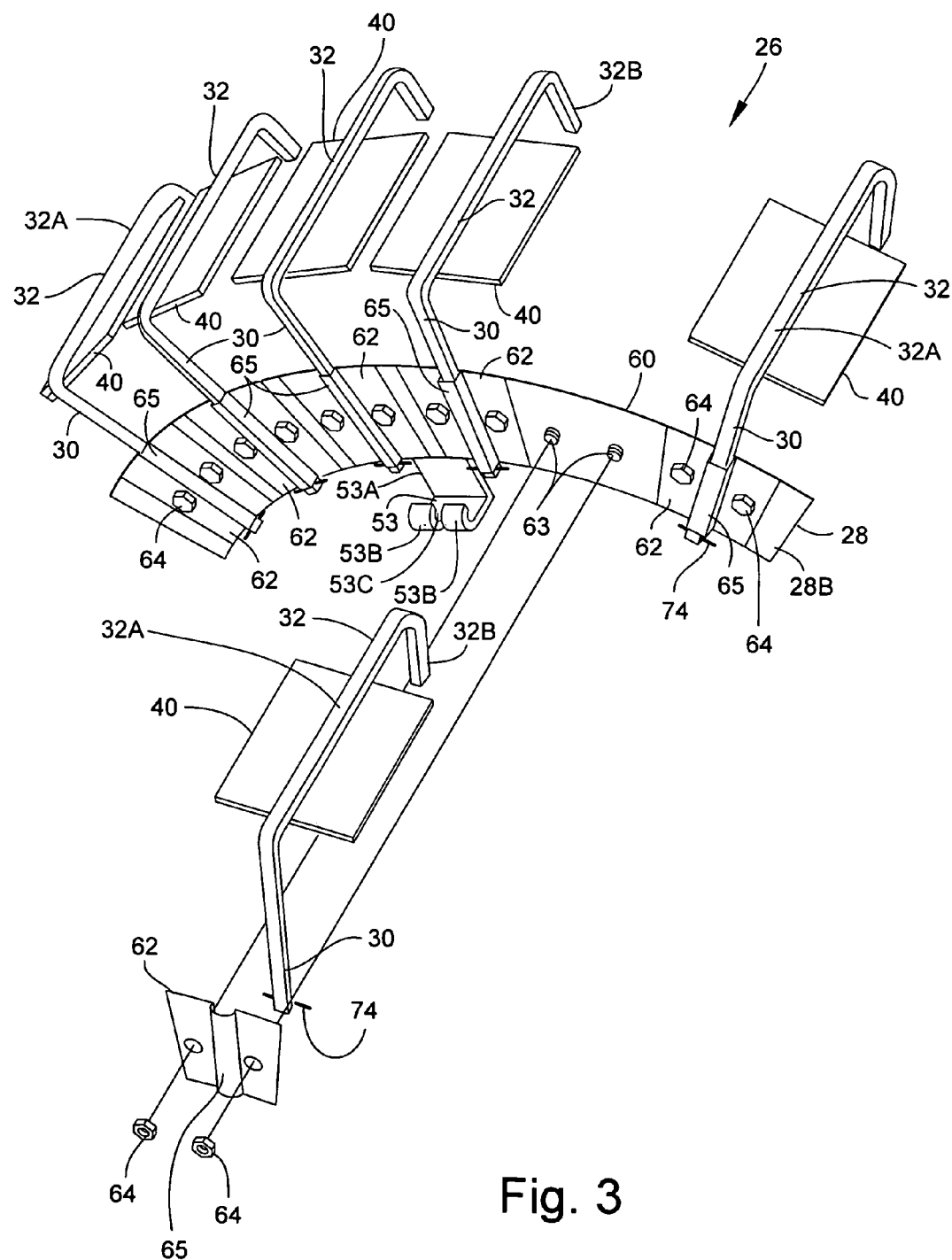
FIG. 3 is an exploded view, in perspective, of one tire-traction section of the tire-traction apparatus of the present invention.
Figure 4:
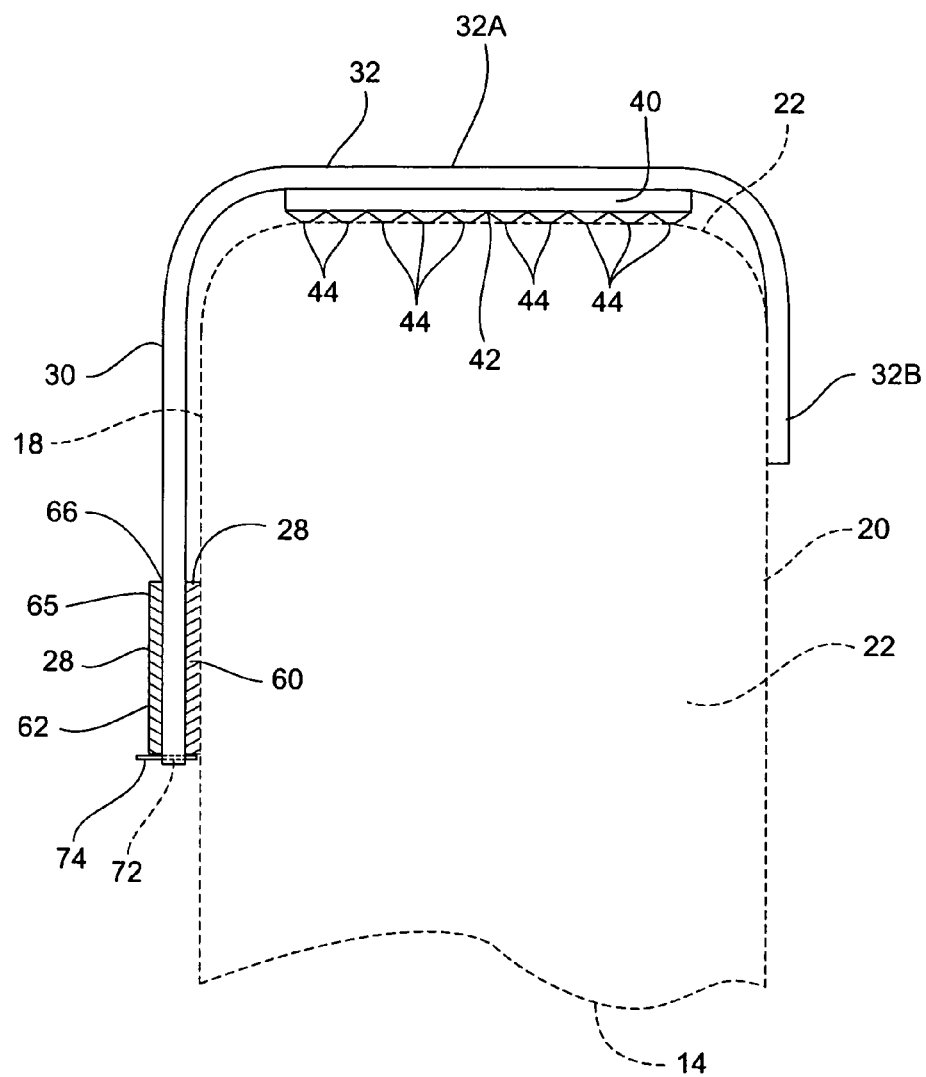
FIG. 4 is an end view, partially in cross-section, illustrating a portion of the tire traction apparatus of the present invention, the vehicle tire being shown in phantom.
Figure 5:
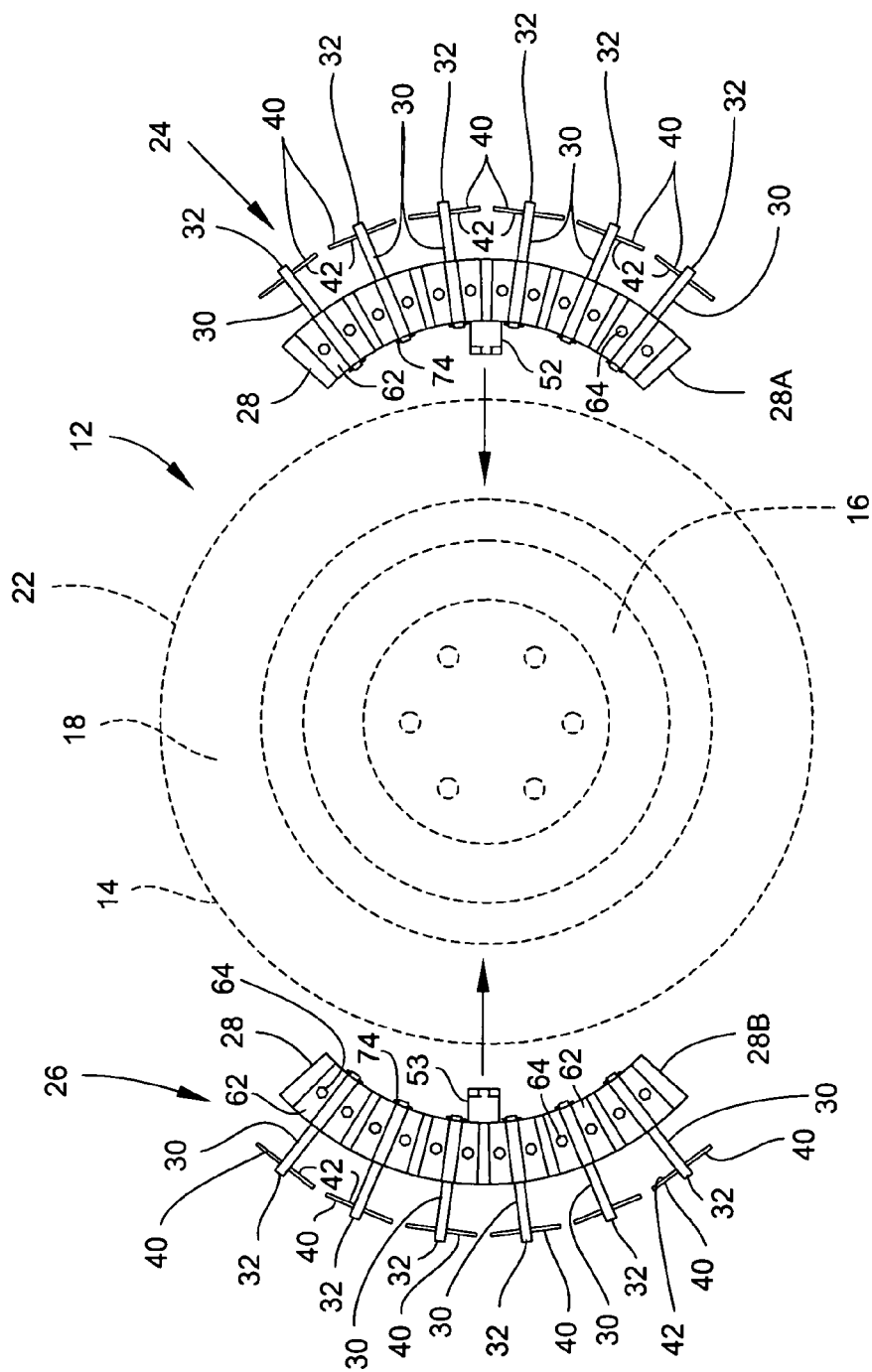
FIGS. 5–6 are exploded views illustrating how both tire traction sections of the tire traction apparatus of the present invention are mounted to a vehicle tire.
Figure 6:
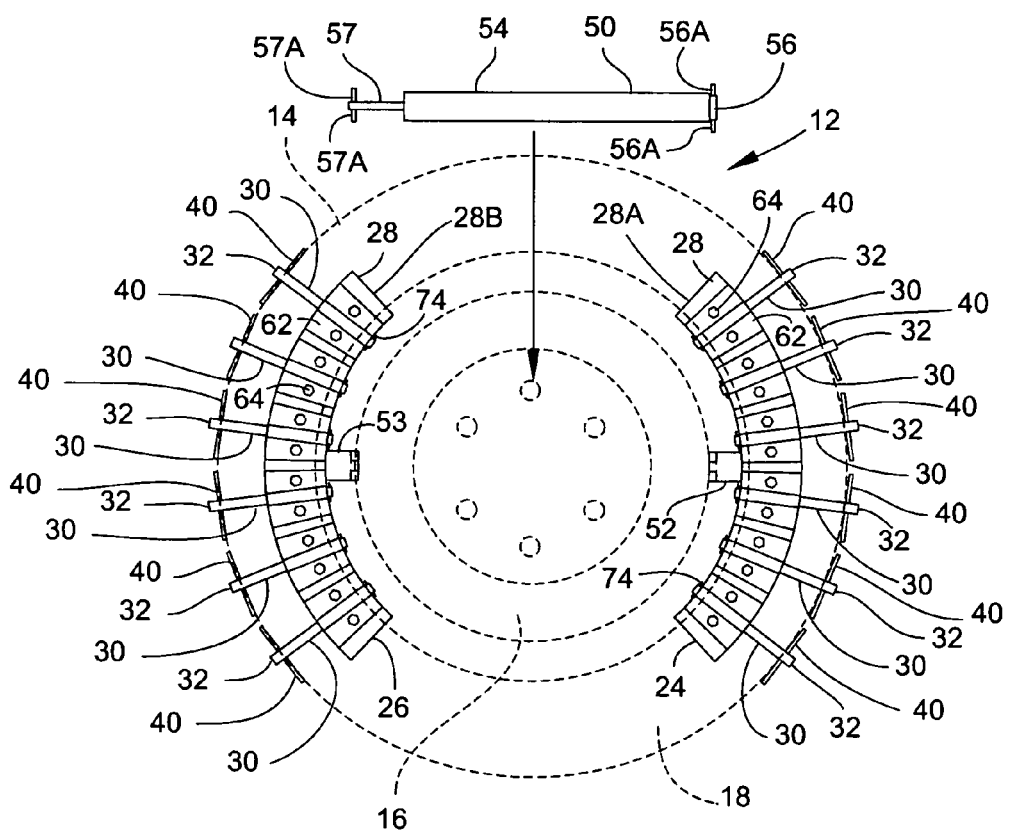
Figure 7:
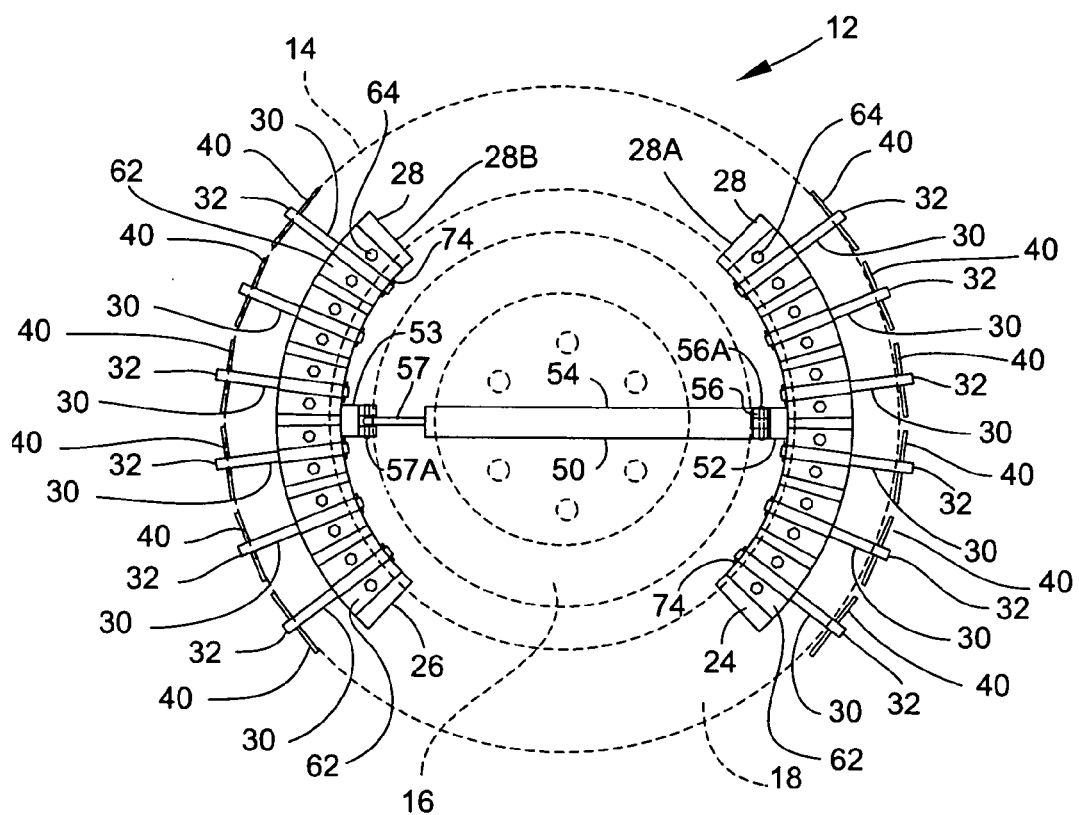
FIG. 7 is a side-elevational view showing the tire traction apparatus of the present invention completely mounted to a vehicle tire, the view being essentially the same as the view of FIG. 2.

Referring to FIGS. 1–4, each tire-traction section 24 and 26 further comprises a plurality of tire-tread contact members 40. As shown in FIG. 4, each tire-tread contact member 40 is attached to portion 32A of a corresponding finger member 32 in such a manner that tire-tread contact member 40 is between portion 32A and vehicle tire tread 22. Tire-tread contact member 40 has tire-tread contact surface 42 that confronts vehicle tire tread 22. Tire-tread contact surface 42 has a plurality of protruding members 44 that contact vehicle tire tread 22. Protruding members 44 provide a frictional relationship between tire-tread contact members 40 and vehicle tire tread 22. In a preferred embodiment, each tire-tread contact member 40 has a generally rectangular shape. However, it is to be understood that each tire-tread contact member 40 can have other suitable geometric shapes. The manner in which protruding members 44 are formed depends upon the materials from which tire-traction apparatus 10 is fabricated. For example, if tire-tractions sections 24 and 26 are fabricated from metal, then protruding members 44 can be formed by a metal stamping process. Alternatively, protruding members 44 can be separate components that are attached to contact surface 42 of tire contact member 40. In such an embodiment, protruding members 44 can be metal or rubber tabs or spikes that are attached to contact surface 42. If tire-tractions sections 24 and 26 are fabricated from plastic, then protruding members 44 can formed by injection molding. However, it is to be understood that these embodiments of protruding members 44 are just examples and that other suitable configurations of protruding members 44 can be used as well.

Referring to FIGS. 1–3 and 5–9, tire traction apparatus 10 further comprises tension-producing connection device 50 which connects both tire traction sections 24 and 26 together and secures tire traction sections 24 and 26 to vehicle tire 14. Arcuate member 28A includes engagement member 52 to which one end of tension-producing connection device 50 is removably engaged. Similarly, arcuate member 28B includes engagement member 53 to which the opposite end of tension-producing connection device 50 is removably engaged. In a preferred embodiment, engagement members 52 and 53 are identically constructed and configured to have a shape of a hook. For example, as shown in FIG. 3, engagement member 53 includes body portion 53A and extending finger portions 53B that are separated by slot 53C. The purpose of such a configuration will be apparent from the ensuing description. Tension-producing connection device 50 produces a tensional force that pulls tire traction sections 24 and 26 toward each so as to secure tire traction sections 24 and 26 to vehicle tire 14. Tension-producing connection device 50 comprises housing 54, stationary member 56 that is attached to housing 54 and movable rod member 57. Stationary member 56 includes engagement pins 56A. Rod member 57 has a portion thereof which is slidably disposed within housing 54. Tension-producing connection device 50 is configured so that rod member 57 cannot be completely removed from housing 54. Housing 54 is configured to normally urge or pull rod member 57 inward into housing 54. Thus, rod member 57 is urged in the direction indicated by arrow 59 (see FIG. 9). Rod member 57 includes engagement pins 57A. Referring to FIGS. 1, 3 and 5–9, in order to attach tension-producing connection device 50 to tire-traction sections 24 and 26, a user first mounts tire traction sections 24 and 26 to vehicle tire 14 (see FIGS. 5 and 6). Next, the user maneuvers tension-producing connection device 50 so that rod member 57 is positioned between slot 53C of engagement member 53 and engagement pins 57A are positioned between body portion 53A and finger members 53B of engagement member 53. Next, the user pulls body member 54 toward tire-traction section 24 so that housing 54 moves with respect to rod member 57. The user then maneuvers tension-producing connection device 50 so that stationary member 56 and engagement pins 56A engage engagement member 52 in the same manner as rod member 57 and engagement pins 57A engaged engagement member 53. Once rod member 57 and stationary member 56 are engaged with engagement members 53 and 52, respectively, tension-producing connection device 50 pulls tire-traction sections 24 and 26 toward each other thereby securing tire-traction sections 24 and 26 to vehicle tire 14. Referring to FIG. 9, in one embodiment, tension-producing connection device 50 comprises a spring 58 located in housing 54. One end of spring 58 is connected to the interior wall of housing 54 and the other end of spring 58 is connected to an end of rod member 57. Spring 58 normally urges rod member 57 in the direction indicated by arrow 59. As a result, spring 58 retracts rod member 57 into housing 54. However, a portion of rod member 57 is always external to housing 54. The curved shape of rod member 57 creates a space between housing 54 and vehicle rim 16 that allows a user to fit his or her hand around housing 54 when removing or attaching tension-producing connection device 50. It is to be understood other suitable tension-producing devices can be used to create a tensional force that pulls tire-traction sections 24 and 26 toward each other so as to secure tire-traction sections 24 and 26 to vehicle tire 14. For example, a turnbuckle can be used to provide the requisite tensional force.

Referring to FIGS. 1–4, arm members 30 are attached to arcuate members 28 such that arm members 30 are generally transverse to arcuate members 28. In a preferred embodiment, arm members 30 are movably attached to arcuate members 30. Each arcuate member 28 comprises base member 60 and a plurality of plates 62 that are attached to base member 60. In one embodiment, screws 63 and nuts 64 are used to attach plates 62 to arcuate member 28. However, other suitable techniques may be used to attach plates 62 to arcuate members 28, e.g. rivets, welding, etc. Each plate 62 defines bulge portion 65. When each plate 62 is attached to base member 60, base member 60 and bulge portion 65 cooperate to define channel 66 (see FIG. 4). Channel 66 is sized to receive a corresponding arm member 30. Each channel 66 has oppositely positioned openings through which portions of a corresponding arm member 30 extend. In a preferred embodiment, each channel 66 is sized so that the corresponding arm member 30 is slidably disposed within channel 66. The ability of arm member 30 to move within channel 66 facilitates mounting of tire-traction apparatus 10 to vehicle tire 14 and ensures that tire-traction contact members 40 are positioned over tire tread 22. Furthermore, the ability of the arm members 30 to move with respect to the corresponding arcuate member 28 ensures that tire-tread contact members 40 will contact vehicle tire tread 22 as vehicle tire 14 rotates.

Referring to FIGS. 1–4, each arm member 30 comprises a locking system that prevents arm member 30 from sliding out of channel 66. In one embodiment, the locking system comprises bore 72 formed through arm member 30 and pin member 74 that is disposed through bore 72. Pin member 74 abuts bulge portion 65 of plate 62 when arm member 30 is extended the maximum limit (see FIG. 4). Pin member 74 has the requisite strength to withstand forces exerted on pin member 74 when tension-producing connection device 50 produces the tensional force that pulls tire-traction sections 24 and 26 together. In one embodiment, pin member 74 is fabricated from metal.

Referring to FIGS. 1, 4 and 8, when tire-traction apparatus 10 is completely mounted to vehicle tire 14, protruding members 44 of tire-tread contact members 40 contact tire tread 22. As vehicle tire 14 rotates, finger members 32 penetrate the soft roadbed, snow, mud, or other terrain thereby providing traction to vehicle tire 14. During rotation of vehicle wheel 14, each finger member 32 and corresponding tire-tread contact member 40 will at some point in time be directly between the road surface and vehicle tire 14. Any expansion of vehicle tire 14 may cause downward forces to be exerted on the finger member 32 and tire-tread contact member 40 that are directly between vehicle tire 14 and the road surface. In response to the aforesaid downward forces, the resiliency of tension-producing connection device 50 allows the tire-traction section (i.e. section 24 or 26) having the affected finger 11 member 32 and tire-tread contact member 40 (i.e. affected by the downward force) to move in the direction of the downward force. This operational characteristic prevents damage to the tire traction section (i.e. section 24 or 26) that is affected by the downward force or which has components thereof that are affected by the aforementioned downward force.

Once the user's vehicle is extricated from the mud, snow, etc., the user then removes tire-traction apparatus 10 from vehicle tire 14. This is accomplished by grasping housing 54 of tension-producing connection device 50 and pulling housing 54 toward tire-traction section 24 so that engagement pins 56A become disengaged from engagement member 52. The used then pulls housing 54 outward (i.e. toward himself or herself) and then allows the tension to pull housing 54 in the reverse direction, i.e. toward tire-traction section 26, so as to allow engagement members 57A to become disengaged from engagement member 53. The user then can remove tire-traction sections 24 and 26 from vehicle tire 14 and then store the entire apparatus 10 within the vehicle (e.g. trunk).

The size of tire-traction apparatus 10 or any components thereof may be varied to fit on tires of different sizes. For example, the length of arm members 30 can be lengthened to accommodate larger diameter tires. Similarly, finger members 32 can be lengthened for relatively wide-tread vehicle tires.

Tire-traction apparatus 10 may be fabricated from suitable materials that have the requisite strength and resiliency. In one embodiment, tire-traction apparatus 10 is fabricated from metal. If tire-traction apparatus 10 is fabricated from metal, then preferably, such metal is coated with a coating that protects the metal from corrosion. In another embodiment, tire-traction apparatus 10 is fabricated from plastic. If tire-traction apparatus 10 is to be fabricated from plastic, then injection molding techniques and methods known in the art may be used. Tire-traction apparatus 10 is lightweight and is easy to transport, use and store. Additionally, during use, tire-traction apparatus 10 is not connected to any portion of the rim (e.g. rim 16) of vehicle wheel 12.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not as limiting the scope and spirit of the invention as set forth in the attached claims.

What is claimed is:

1. A vehicle tire-traction apparatus for use with a vehicle tire having an outer sidewall, an inner sidewall and a tread, the vehicle tire-traction apparatus comprising:
  a pair of tire-traction sections wherein each tire-traction section comprises:
    a generally arcuate member for placement over a vehicle tire outer sidewall, each arcuate member having a plurality of channels, each arcuate member further including an engagement member located at a generally central portion of the arcuate member,
    a plurality of arm members, each arm member being slidably disposed within a corresponding channel and transverse to the arcuate member, each arm member having a first end portion and a second end portion opposite the first end portion,
    a plurality of finger members, each finger member being attached to the first end portion of a corresponding arm member and configured to extend over a vehicle tire tread and a portion of a vehicle tire inner sidewall,
  wherein the second end portion of each arm member extends from the corresponding channel and has a pin member that prevents the arm member from sliding out of the channel,
  a plurality of tire-tread contact members, each tire-tread contact member being attached to a single finger member and positioned with respect to that finger member such that the tire-tread contact member extends over a portion of the vehicle tire tread when the tire-traction apparatus is mounted to a vehicle tire, each tire-tread contact member having a plurality of protruding members to frictionally contact the vehicle tire tread,
  wherein the ability of each arm member to slide within its corresponding channel ensures that the tire tread contact member attached to the arm member contacts the vehicle tire tread as the vehicle tire rotates; and
  a tension-producing connection device configured to be connected to the engagement member of each arcuate member so as to connect both tire traction sections together and secure the tire traction sections to the vehicle tire, the tension-producing connection device comprising an elongate housing having an interior wall, a stationary member attached to the housing and configured to be attached to an engagement member of one of the arcuate members, a movable rod member having one portion positioned within the housing and another portion outside the housing and configured to be attached to the engagement member of the other arcuate member, the movable rod being movable with respect to the housing, the tension-producing connection device further comprising a spring member positioned within the housing, the spring member having one end attached to the interior wall of the housing and another end attached to the portion of the movable rod member that is within the housing, the spring member normally pulling the movable rod member inward into the housing so as to provide a tensional force when the tension-producing connection device is attached to the arcuate members wherein such tensional force pulls the tire traction sections toward to each other to secure the tire-traction sections to the vehicle tire.

* * * * *